United States Patent
Heinrich et al.

(10) Patent No.: US 11,201,504 B2
(45) Date of Patent: Dec. 14, 2021

(54) CIRCUIT FOR INDUCTIVELY TRANSFERRING ELECTRICAL ENERGY

(71) Applicant: Balluff GmbH, Neuhausen a.d.F. (DE)

(72) Inventors: Joerg Heinrich, Duerrlewang (DE); David Maier, Buehl (DE); Nejila Parspour, Gerlingen (DE)

(73) Assignee: Balluff GmbH, Neuhausen a.d.F. (DE)

( * ) Notice: Subject to any disclaimer, the term of this patent is extended or adjusted under 35 U.S.C. 154(b) by 0 days.

(21) Appl. No.: 16/817,776

(22) Filed: Mar. 13, 2020

(65) Prior Publication Data
US 2020/0295604 A1 Sep. 17, 2020

(30) Foreign Application Priority Data
Mar. 15, 2019 (DE) .................. 10 2019 106 720.0

(51) Int. Cl.
*H02J 50/12* (2016.01)
(52) U.S. Cl.
CPC .................................. *H02J 50/12* (2016.02)
(58) Field of Classification Search
CPC ....................................................... H02J 50/12
See application file for complete search history.

(56) References Cited

U.S. PATENT DOCUMENTS

| | | | | |
|---|---|---|---|---|
| 9,041,254 B2* | 5/2015 | Lisuwandi | .............. | H02J 50/12 307/104 |
| 9,125,242 B2* | 9/2015 | Budgett | ................... | H05B 6/08 |
| 9,231,412 B2* | 1/2016 | Lisi | ........................ | H02J 7/0047 |
| 9,643,505 B2 | 5/2017 | Ichikawa et al. | | |
| 9,649,946 B2 | 5/2017 | Ichikawa et al. | | |
| 9,826,670 B2 | 11/2017 | Nakamura et al. | | |
| 10,554,115 B2* | 2/2020 | Mao | ........................ | H02M 1/12 |
| 10,700,544 B2* | 6/2020 | Park | ...................... | H02J 7/0013 |
| 2010/0314946 A1 | 12/2010 | Budde et al. | | |
| 2011/0080051 A1* | 4/2011 | Lee | ......................... | H02J 50/80 307/104 |
| 2015/0054354 A1 | 2/2015 | Lemmens et al. | | |
| 2015/0236517 A1* | 8/2015 | Deguchi | ................. | H01F 27/23 307/104 |
| 2015/0276965 A1 | 10/2015 | Turki | | |
| 2018/0048162 A1* | 2/2018 | Von Novak | .......... | H04B 5/0031 |

(Continued)

FOREIGN PATENT DOCUMENTS

DE 20 2007 011 745 U1 12/2007
DE 20 2009 009 689 U1 11/2010
(Continued)

OTHER PUBLICATIONS

David Maier, Jörg Heinrich, Marco Zimmer, Marcel Maier, Nejila Parspour, "Contribution to the System Design of Contactless Energy Transfer Systems," IEEE Transactions on Industry Applications, vol. 55, No. 1, Jan./Feb. 2019, total of 11 pages (https://ieeexplore.ieee.org/document/8440726).

(Continued)

*Primary Examiner* — Thomas J. Hiltunen
(74) *Attorney, Agent, or Firm* — Collard & Roe, P.C.

(57) ABSTRACT

A circuit for inductively transferring electrical energy from a primary side to a secondary side has a primary-sided autoresonant power oscillator compensated in parallel having a primary inductivity and serially compensated secondary sides each having a secondary inductivity.

6 Claims, 3 Drawing Sheets

(56) References Cited

U.S. PATENT DOCUMENTS

| | | | |
|---|---|---|---|
| 2019/0325731 A1 | 10/2019 | Gaggero et al. | |
| 2020/0295599 A1* | 9/2020 | Heinrich | H02J 50/10 |
| 2020/0295600 A1* | 9/2020 | Heinrich | H01Q 7/00 |

FOREIGN PATENT DOCUMENTS

| | | |
|---|---|---|
| DE | 10 2012 108 671 A1 | 5/2014 |
| DE | 11 2013 001 910 T5 | 12/2014 |
| DE | 10 2013 219 527 A1 | 4/2015 |
| DE | 11 2013 004 469 T5 | 5/2015 |
| DE | 11 2013 006 982 T5 | 4/2016 |
| DE | 10 2015 005 871 A1 | 1/2017 |
| DE | 10 2016 202 047 A1 | 8/2017 |
| DE | 10 2018 109 267 A1 | 10/2019 |
| EP | 2 428 969 B1 | 10/2016 |
| WO | 2016/078814 A1 | 5/2016 |

OTHER PUBLICATIONS

Marcel Maier, David Maier, Marco Zimmer, Nejila Parspour, "A Novel Self Oscillating Power Electronics for Contactless Energy Transfer and Frequency Shift Keying Modulation," International Symposium on Power Electronics, Electrical Drives, Automation and Motion (SPEEDAM), Anacapri, Italy, Jun. 2016, pp. 67-72, total of 6 pages.

German Office Action dated Jan. 8, 2020 in German Application No. 10 2019 106 716.2 with English translation of the relevant parts.

German Office Action dated Jan. 8, 2020 in German Application No. 10 2019 106 719.7 with English translation of the relevant parts.

German Office Action dated Jan. 13, 2020 in German Application No. 10 2019 106 720.0 with English translation oi the relevant parts.

\* cited by examiner

CIRCUIT FOR INDUCTIVELY TRANSFERRING ELECTRICAL ENERGY

CROSS REFERENCE TO RELATED APPLICATIONS

Applicant claims priority under 35 U.S.C. § 119 of German Application No. 10 2019 106 720.0 filed Mar. 15, 2019, the disclosure of which is incorporated by reference.

BACKGROUND OF THE INVENTION

1. Field of the Invention

The invention relates to a circuit for inductively transferring electrical energy from a primary side to a secondary side.

2. Description of the Related Art

Devices for inductively transferring electrical energy are known from the prior art.

Thus, a device for inductively transferring electrical energy from a stationary unit having at least one primary inductivity to a vehicle adjacent to this having at least one secondary inductivity emerges from DE 20 2009 009 689 U1, for example. DE 10 2015 005 871 A1 describes a system for contactlessly transferring energy from an underground primary conductor to a vehicle standing on the ground, in particular, wherein the vehicle has a secondary winding arrangement that can be coupled inductively to the primary conductor.

In the industrial sector, sensors and actuators are arranged on fastening elements, which are formed, for example, as so-called active rods, by means of which energy and/or data are transferred to sensors, for example, by means of an electromagnetic coupling method. Such a fastening element emerges from the non-prepublished application DE 10 2018 109 267.9 of the applicant.

In industrial application, it is advantageous when several sensors are arranged on a single fastening element, for example in the form of a rod, for example, of 70 cm in length and 8 cm in diameter. Here, the transfer of the energy can be implemented as a point-to-point system. With such a transfer as a point-to-point system, one power electronic unit must be provided on the primary side per recipient on the secondary side, for example, a sensor. A continuous positioning along the carrier, i.e. a rod, for example, is hereby not possible. Whether a rotatable positioning is possible depends on the rotational degree of freedom, which is determined by the design of the winding. Different kinds of winding are known, for example, windings in the shape of a circle/rectangle/solenoid.

Preferably, several sensors and/or actuators should be arranged to be able to be freely positionable and rotatable on such a rod. Here, the sensors and actuators must be supplied with electrical energy. In addition, a data transfer must take place. Circuits are also already known from the prior art, which have an autoresonant Royer oscillator, in which a primary side inductively provides a secondary side with electrical energy. Here, a parallel idle power compensation system is used on the primary side. Such a circuit emerges, for example, from the German utility model DE 20 2007 011745 U1.

In FIG. 1, an autoresonant Royer oscillator known from the prior art is schematically depicted, as it emerges, for example, from said utility model.

The object of the invention is to provide a circuit which enables the supply of one or more recipients on the secondary side in an inductive energy transfer system by means of a primary side. In this way, it shall be possible to supply a sensor system with several sensors.

SUMMARY OF THE INVENTION

According to the invention, the object is solved by a circuit for inductively transferring electrical energy from a primary side to a secondary side by means of a primary-sided autoresonant power oscillator compensated in parallel having a primary inductivity and a plurality of serially compensated secondary sides each having a secondary inductivity.

The fundamental idea of the invention is to extend a Royer oscillator across several secondary sides. A separate load is attached to each secondary side. The advantage of the solution according to invention lies in that the secondary sides can be operated completely independently of one another.

According to a very advantageous aspect of the invention, it is thus provided that the primary-sided, autoresonant power oscillator compensated in parallel is an autoresonant Royer oscillator.

Furthermore, it is advantageously provided that the serially compensated secondary sides each have their own rectifier.

For the secondary sides to be able to be operated completely independently of one another, it is provided that a tuning to a predetermined identical resonance frequency, also referred to below as design resonance frequency, takes place between the secondary-sided recipients and the primary side.

The transferred power between the individual recipients can vary; to do so, the inductivities of the recipients can be adjusted independently of one another provided a tuning to the same design resonance frequency takes place.

The secondary inductivities, i.e. the winding numbers of the secondary inductivities, can be varied and chosen dependent on a power to be decreased.

Moreover, it is provided that the primary side and the secondary side are designed in such a way that the averaged electrical energy, which all secondary sides extract, is less than or equal to the energy available on the primary side.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
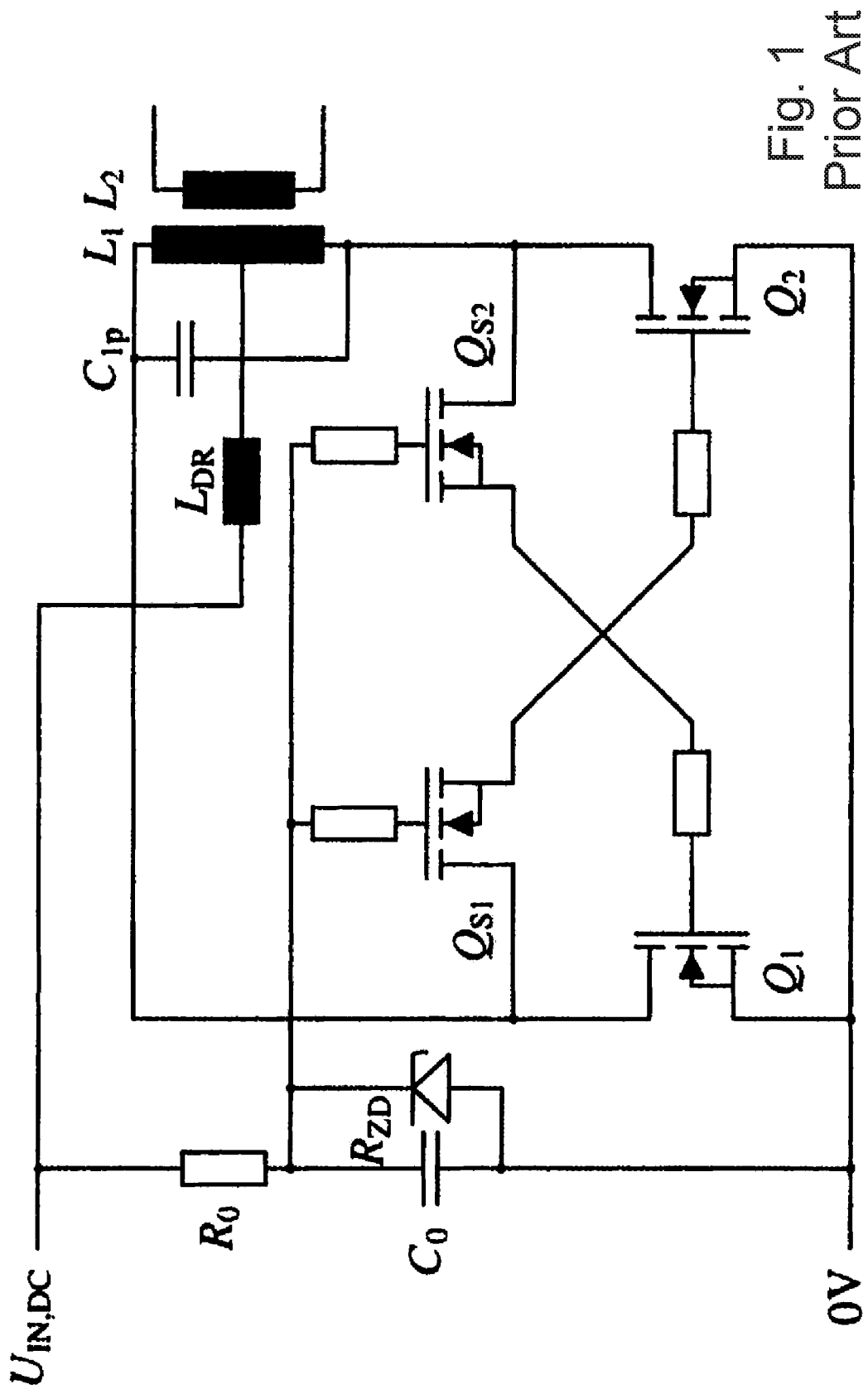
FIG. 1 shows a circuit known from the prior art of a Royer oscillator.

In FIG. 1, a Royer oscillator known from the prior art is depicted, which is realized with MOSFETs. Such a Royer oscillator constitutes an autoresonant power oscillator; it emerges, for example, from DE 20 2007 011 745 U1, to which reference is presently made.

Figure 2:
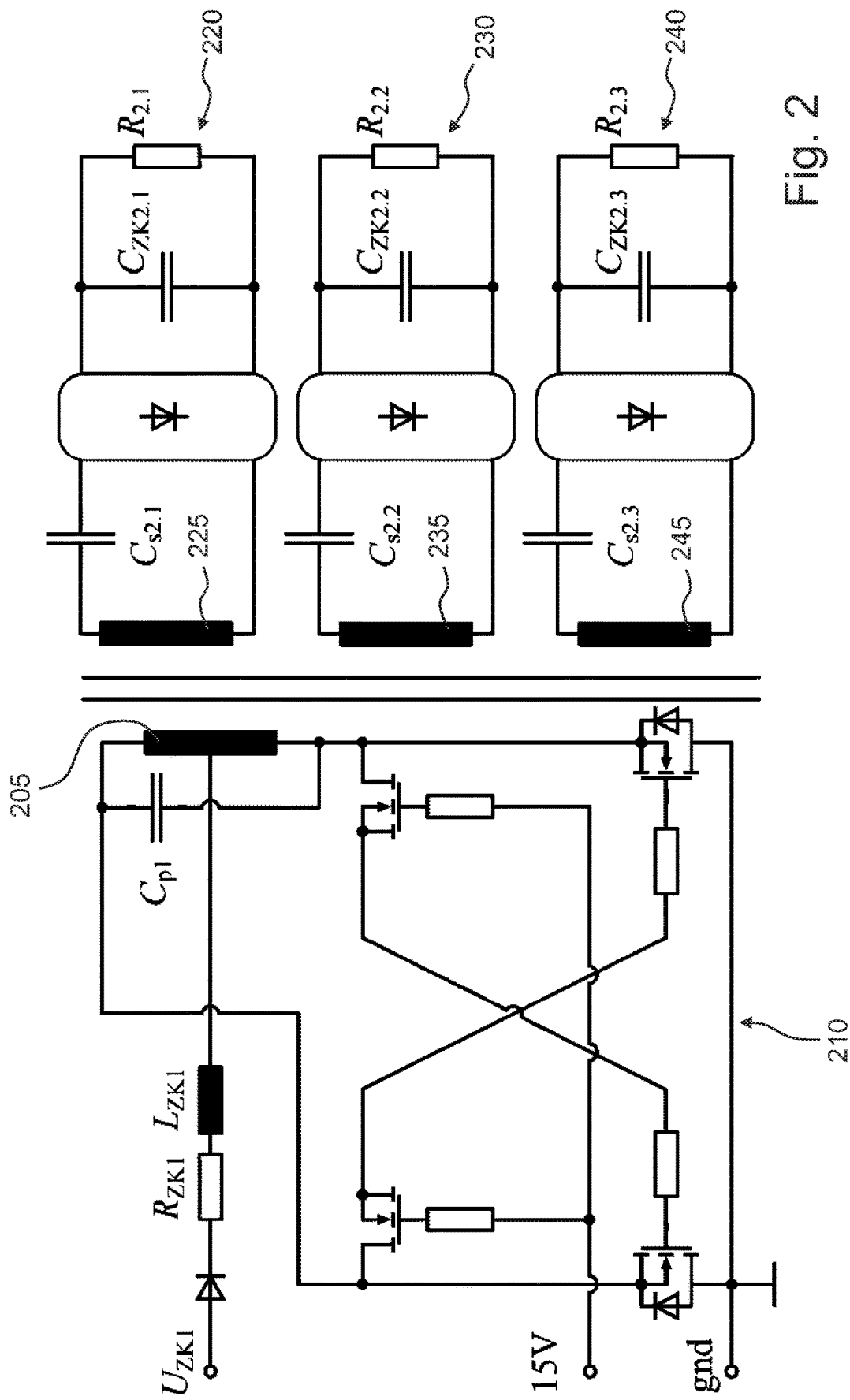
FIG. 2 shows the circuit according to the invention for inductively transferring electrical energy from a primary side to recipients on the secondary side.

FIG. 2 shows a circuit according to the invention for inductively transferring electrical energy from a primary side 201 to three recipients 220, 230, 240 arranged on the secondary side.

The primary side is realized as an autoresonant Royer oscillator having a primary inductivity 205, which transfers electrical energy to inductivities 225, 235, 245 on the secondary side. Each secondary side 220, 230, 240 has its own compensation circuit and its own rectifier. A single load R2.1, R2.2, R2.3 is attached to each secondary side 220, 230, 240. The secondary sides can be operated completely independently of one another. A criterion, which must be fulfilled, is a tuning to an identical design resonance frequency between the secondary-sided recipients and the primary side. The transferred power between the individual secondary-sided recipients can vary. To do so, the inductivities 225, 235, 245 of the recipients can be adjusted independently of one another, for example by changing the winding number of the windings on the secondary side. However, the change must take place in such a way that the tuning to the same design resonance frequency takes place.

All recipients must be compensated in series, a parallel compensation having several recipients is not possible because of the system behavior.

Figure 3A:
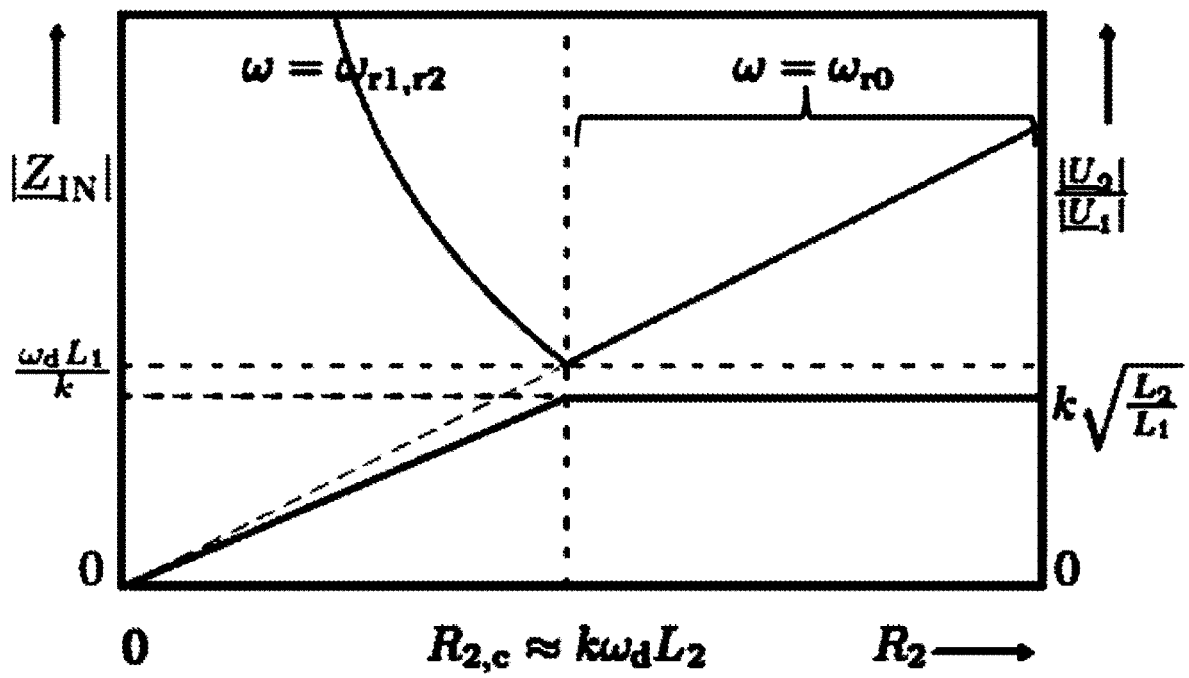
FIG. 3a shows the system behavior of the circuit depicted in FIG. 2.
Figure 3B:
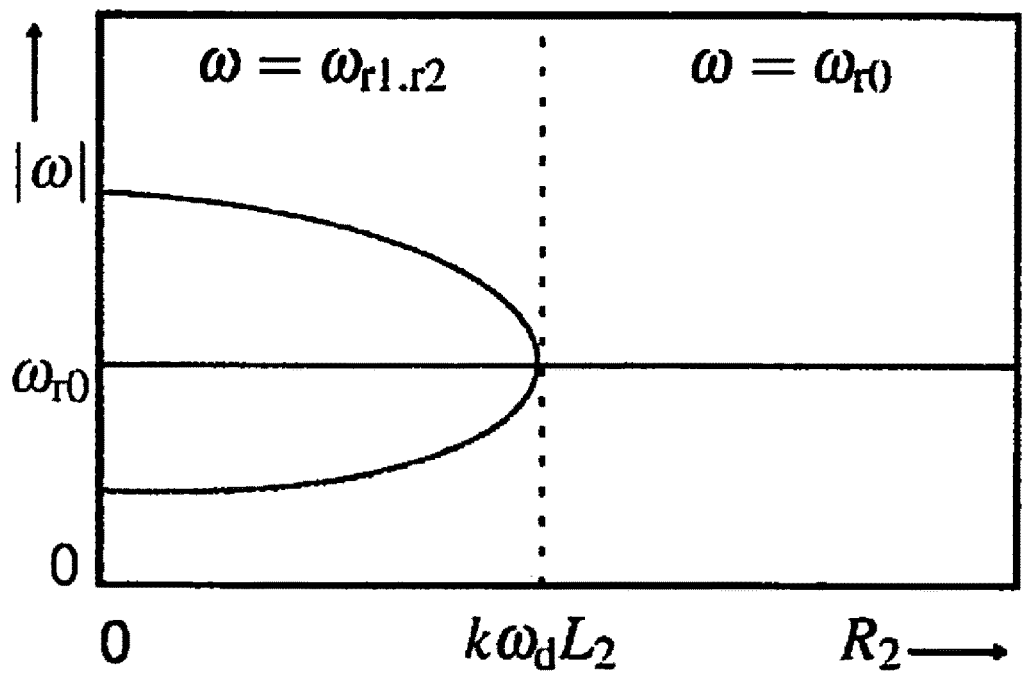
FIG. 3b shows the frequency response of the circuit depicted in FIG. 2.

The system behavior is depicted in FIG. 3a. FIG. 3b shows the frequency response of the system compensated in parallel on the primary side and in series on the secondary side, referred to as 1p2s-system for short. The voltage transfer function and the current transfer function $M_u$ are depicted in FIG. 1a. The voltage transfer function and the current transfer function of the system for the resonance frequency ω_r0 are $$|Z_{IN}| = \frac{R_2 L_1}{L_2 k^2}$$

$$M_U = k\sqrt{\frac{L_2}{L_1}}$$

and for the resonance frequencies ω_r1r2 are $$|Z_{IN}| = \frac{\omega_d^2 L_1 L_2 (1 - k^2)}{R_2}$$

$$M_U = \frac{R_2}{\omega_d \sqrt{L_1 L_2 (1 - k^2)}}.$$

The design resonance frequency ωd is determined by $$C_{1p} = \frac{1}{\omega_d^2 L_1}$$

and $$C_{2x} = \frac{1}{\omega_d^2 L_2 (1 - k^2)}.$$

So that the resonance frequency remains constant, the operation with a load resistance of R2>R2,c is necessary according to FIG. 3b, wherein index c stands for the characteristic resistance, at which it results in case analysis of the resonance frequencies wr0, wr1, wr2. The sum of all load resistances (parallel circuit) must therefore fulfil the criterion R2>R2,c so that the resonance frequency for all recipients is identical. In exceptional or erroneous cases, for example a short circuit, individual recipients can violate the criterion R2>R2,c if the energy decrease of the individual recipients is small in comparison to the available overall power of the primary side.

As depicted in FIG. 4, the operating point of the circuit on the right side is to be chosen with the resonance frequency ω=ω_r0. In this, the starting voltage is constant and only one function of the coupling factor. This does not constitute any problem, since the coupling factor is virtually constant for the desired system, and small deviations can be eliminated by an inherently known voltage stabilisation device not depicted here.

As depicted in FIGS. 3a and 3b, there is only one resonance frequency on the right side, to which all recipients can be tuned (compensated).

The system design and the choice of the compensation capacitors also aim for the resonance frequency to be independent of the load. This means that the autoresonant power oscillator does not change its operating frequency if the load does not fall below the characteristic resistance. This must be taken into consideration with the system design. This means that the operating point of each recipient is placed in the region of the constant voltage transfer function, which is depicted in FIGS. 3a and 3b on the right when ω=ω_r0. During the switching-on process or in the case of a short circuit, this criterion is indeed violated. However, because of the design of the primary side for n recipients, the case of a short circuit of a recipient does not lead to a noticeable change of the operating frequency, since the idle power on the primary side in the system is much larger than in a recipient on the secondary side. If several recipients on the secondary side were to fall below the load resistance, this would result in a tangible frequency change dependent on load (ω_r1,r2 is a resonance frequency dependent on load), which then leads to a problem with matching with recipients having a load resistance larger than R2,c, as depicted above.

Due to the system design, in particular the low coupling factor, the problem of the frequency change is already avoided by the design. The influence of the secondary side on the primary side giving the frequency increases with increasing coupling between secondary and primary side. Since the coupling between one single secondary-sided recipient and the primary side is nevertheless low, the influence on the frequency change is also low in an erroneous case. Furthermore, the secondary side can be designed in such a way that it is of high impedance in the erroneous case.

The depicted circuit according to the invention makes it possible to supply one or more secondary-sided recipients with a primary-sided autoresonant power electronic system without additional regulation measures, wherein each recipient is operated in the nominal operating point and can reduce an arbitrary amount of power without influencing the other recipients if the nominal operating point of all secondary sides is in the ω=ω_r0 range. (Parallel circuit of individual recipients results in smaller R2_"overall", 8 recipients with R2=R2c would not work since the resulting resistance, which sees the primary side, is then much smaller than R2,c.)

Although only a few embodiments of the present invention have been shown and described, it is to be understood that many changes and modifications may be made thereunto without departing from the spirit and scope of the invention.

What is claimed is:

1. A circuit for inductively transferring electrical energy from a primary side to a secondary side, comprising a primary-sided autoresonant power oscillator compensated in parallel having a primary inductivity (205) and a plurality of serially compensated secondary sides each having a secondary inductivity (225, 235, 245),
   wherein the circuit is designed to place an operating point of each recipient on the secondary side in a region of a constant voltage transfer function at the resonance frequency, so that a coupling factor between the secondary-sided recipient and the primary side is low.

2. The circuit according to claim 1, wherein the primary-sided autoresonant power oscillator compensated in parallel is an autoresonant Royer oscillator.

3. The circuit according to claim 1, wherein the serially compensated secondary sides each have a rectifier.

4. The circuit according to claim 1, wherein the primary side and the secondary side are tuned to a resonance frequency that can be predetermined.

5. The circuit according to claim 1, wherein the winding number of the secondary inductivities (225, 235, 245) can be varied dependent on a power to be evoked.

6. A circuit for inductively transferring electrical energy from a primary side to a secondary side, comprising
   a primary-sided autoresonant power oscillator compensated in parallel having a primary inductivity (205) and
   a plurality of serially compensated secondary sides each having a secondary inductivity (225, 235, 245),
   wherein the primary-sided autoresonant power oscillator and the secondary sides are designed in such a way that the averaged electrical energy, which all secondary sides extract, is less than or equal to the energy available on the primary side, and the operating point of all secondary sides can be found condensed in the range $R2 > R2,c$,
   wherein the circuit is designed to place the operating point of each recipient on the secondary side in a region of a constant voltage transfer function at the resonance frequency, so that a coupling factor between the secondary-sided recipient and the primary side is low.

\* \* \* \* \*